United States Patent [19]

Erdman et al.

[11] Patent Number: 5,696,430

[45] Date of Patent: Dec. 9, 1997

[54] CIRCUIT, MOTOR, AND METHOD GENERATING A SIGNAL REPRESENTING BACK EMF IN AN ENERGIZED MOTOR WINDING

[75] Inventors: David M. Erdman, Fort Wayne, Ind.; Eric R. Benedict, Midland, Mich.

[73] Assignee: General Electric Company, Fort Wayne, Ind.

[21] Appl. No.: 469,200

[22] Filed: Jun. 6, 1995

Related U.S. Application Data

[63] Continuation-in-part of Ser. No. 352,393, Dec. 8, 1994, which is a continuation of Ser. No. 23,790, Feb. 22, 1993, abandoned.

[51] Int. Cl.$^6$ ................................................ H02P 7/00
[52] U.S. Cl. ..................................... 318/254; 318/439
[58] Field of Search ........................... 318/254, 439, 318/178

[56] References Cited

U.S. PATENT DOCUMENTS

| | | | |
|---|---|---|---|
| 2,679,607 | 5/1954 | Potter | 310/218 |
| 3,678,352 | 7/1972 | Bedford | 318/254 X |
| 3,679,953 | 7/1972 | Bedford | 318/254 X |
| 3,740,629 | 6/1973 | Kohlhagen | 318/138 |
| 3,818,310 | 6/1974 | Smith | 321/18 |
| 3,824,446 | 7/1974 | Forster et al. | 318/138 X |
| 3,849,718 | 11/1974 | Forster et al. | 318/138 X |
| 3,879,549 | 4/1975 | Boesel | 310/218 |
| 4,030,005 | 6/1977 | Doeman | 318/138 |
| 4,167,691 | 9/1979 | Sorensen et al. | 318/138 |
| 4,199,892 | 4/1980 | Saito et al. | 318/138 |
| 4,360,770 | 11/1982 | Ray et al. | 318/254 X |
| 4,374,347 | 2/1983 | Muller | 318/138 |
| 4,376,261 | 3/1983 | vonder Heide et al. | 318/254 |
| 4,379,984 | 4/1983 | Muller | 318/254 |
| 4,401,933 | 8/1983 | Davy et al. | 318/778 |
| 4,499,407 | 2/1985 | Macleod | 318/254 |
| 4,520,296 | 5/1985 | Lepper et al. | 318/254 |
| 4,533,986 | 8/1985 | Jones | 363/17 |
| 4,556,827 | 12/1985 | Erdman | 318/254 |
| 4,558,264 | 12/1985 | Weischedel | 318/254 |

(List continued on next page.)

FOREIGN PATENT DOCUMENTS

| | | | |
|---|---|---|---|
| 89939/91 | 6/1992 | Australia . | |
| 3314300A1 | 10/1984 | Germany | H03K 5/01 |
| 8714498 | 12/1987 | Germany | H02P 7/63 |
| 1064583 | 9/1987 | Japan | H02P 6/02 |
| 1268482 | 4/1988 | Japan | H02P 6/02 |

OTHER PUBLICATIONS

R. Itoh et al., "Single–Phase Sinusoidal Rectifier With Step–up/down Characterisitcs," Nov. 1991, IEEE Proceedings–B, vol. 138, No. 6.

Jufer, et al., "Back EMF Indirect Detection for Self–Commutation of Synchronous Motors," 1987, European Power Electronics Conference, pp. 1125–1129.

A 700–V Interface IC for Power Bridge Circuits; Schoofs and Dupont; 1990 IEEE; pp. 677–682.

Integrated Current Regulation for a Brushless ECM Drive; Jahns, Becerra and Ehsani; 1991 IEEE; pp. 118–126.

*Primary Examiner*—Jonathan Wysocki
*Attorney, Agent, or Firm*—Ralph E. Krisher, Jr.

[57] ABSTRACT

A motor includes a stationary assembly and a rotatable assembly in magnetic coupling relation thereto. The stationary assembly includes a winding, the rotation of the rotatable assembly inducing a back EMF in the winding. A power supply for supplying a voltage across the winding drives a current through the winding. A back EMF sensor connected to the winding generates a back EMF signal representative of the back EMF induced in the winding during periods of time when the voltage is being supplied across the winding. An inverter connected between the power supply and the winding commutates the winding as a function of the back EMF signal, whereby the rotatable assembly rotates. A method of operating the motor and a control circuit for the motor employ the back emf induced in the winding during periods when the voltage is being applied to the winding by the power supply.

23 Claims, 2 Drawing Sheets

U.S. PATENT DOCUMENTS

| | | | |
|---|---|---|---|
| 4,563,619 | 1/1986 | Davis et al. | 318/138 |
| 4,578,623 | 3/1986 | Tsukutani et al. | 318/254 |
| 4,644,233 | 2/1987 | Suzuki | 318/254 |
| 4,651,079 | 3/1987 | Wills | 318/811 |
| 4,654,566 | 3/1987 | Erdman | 318/254 |
| 4,673,849 | 6/1987 | Sears et al. | 318/138 X |
| 4,678,974 | 7/1987 | Guastadini | 318/254 |
| 4,710,684 | 12/1987 | Okita et al. | 318/254 |
| 4,733,146 | 3/1988 | Hamby | 318/393 |
| 4,734,627 | 3/1988 | Koerner | 318/254 |
| 4,737,674 | 4/1988 | Miyao | 310/268 |
| 4,743,815 | 5/1988 | Gee et al. | 318/254 |
| 4,748,388 | 5/1988 | Müller | 318/254 |
| 4,755,728 | 7/1988 | Ban | 318/254 |
| 4,835,448 | 5/1989 | Dishner et al. | 318/254 |
| 4,851,751 | 7/1989 | Gipson | 318/599 |
| 4,870,332 | 9/1989 | Coghran et al. | 318/254 |
| 4,872,123 | 10/1989 | Morita | 318/439 X |
| 4,891,537 | 1/1990 | Shiraki et al | 318/138 X |
| 4,935,861 | 6/1990 | Johnson, Jr. et al. | 363/132 |
| 4,937,467 | 6/1990 | Tuska et al. | 307/264 |
| 4,972,134 | 11/1990 | Getz et al. | 318/817 |
| 5,005,115 | 4/1991 | Schauder | 363/159 |
| 5,012,166 | 4/1991 | Ushijima et al. | 318/254 |
| 5,053,688 | 10/1991 | Rees | 318/254 X |
| 5,057,733 | 10/1991 | Sonoda et al. | 310/269 |
| 5,075,610 | 12/1991 | Harris | 318/701 |
| 5,086,265 | 2/1992 | Uhlendorf | 318/817 |
| 5,097,168 | 3/1992 | Takekoshi et al. | 310/254 |
| 5,376,866 | 12/1994 | Erdman | 318/254 |
| 5,448,149 | 9/1995 | Ehsani et al. | 318/254 X |

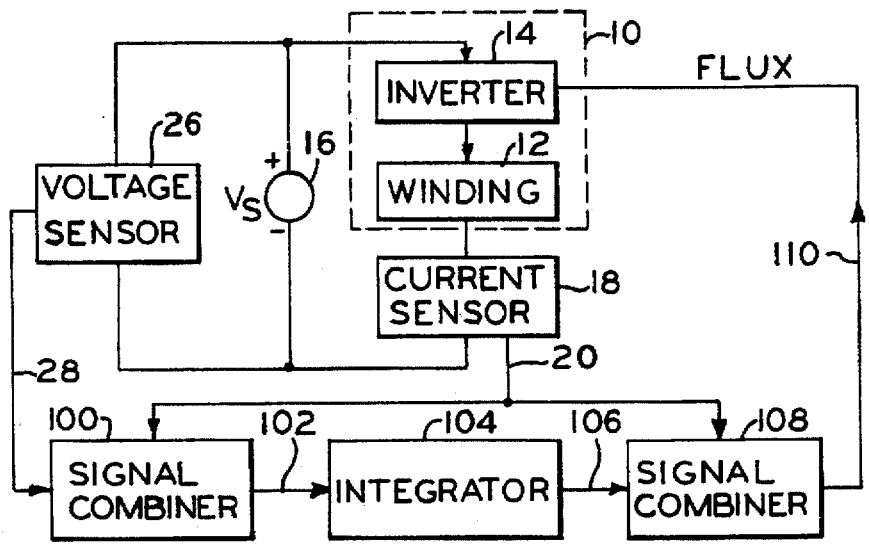
FIG_3
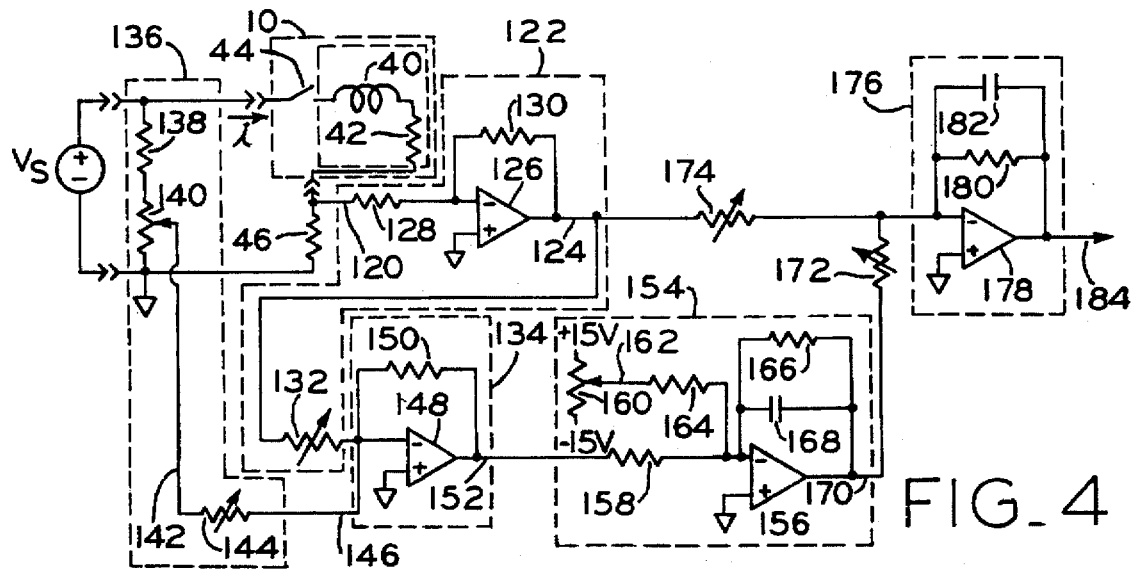
FIG_4
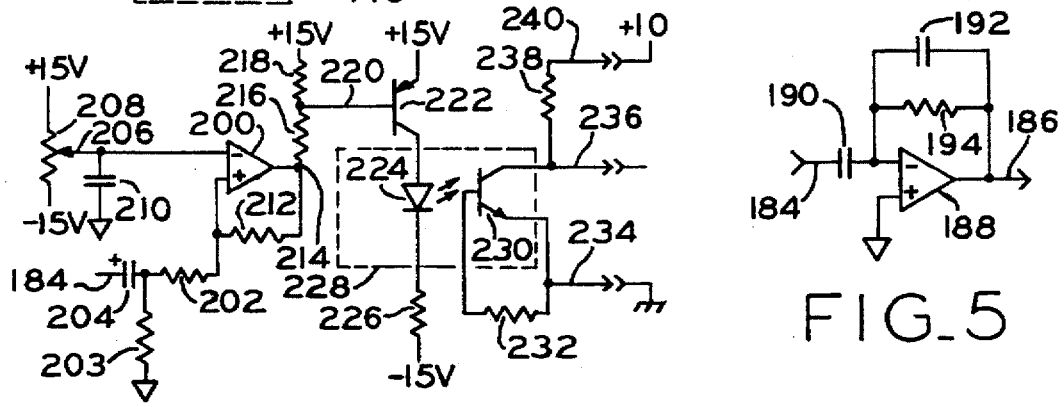
FIG_6   FIG_5

CIRCUIT, MOTOR, AND METHOD GENERATING A SIGNAL REPRESENTING BACK EMF IN AN ENERGIZED MOTOR WINDING

CROSS-REFERENCE TO RELATED APPLICATIONS

This application is a continuation-in-part of U.S. patent application Ser. No. 08/352,393 filed Dec. 8, 1994, which is a continuation of U.S. patent application Ser. No. 08/023,790, filed Feb. 22, 1993, now abandoned, the disclosures of which are incorporated by reference herein in their entirety.

BACKGROUND OF THE INVENTION

The invention generally relates to electronically controlled motors and, in particular, to commutating such motors in response to a back EMF signal induced in the energized winding(s) of such motors.

Single phase electric motors have been in common use for many years. These motors typically require a physical position sensor on the rotor, such as a Hall effect device, to control commutation of the winding to cause the rotor to rotate. Multiphase electric motors have also been in common use for a long time. These motors often sense the back EMF induced in one of the windings when the winding is not being energized to control commutation of another winding. Although back EMF sensing has been used in controlling commutation in multiphase motors, it has not previously been used in single phase motors which have only one winding and are therefore not compatible with traditional back EMF sensing techniques.

There is a need for a back EMF position sensor which senses the back EMF in a motor winding while the winding is being energized by a voltage and is carrying a current.

SUMMARY OF THE INVENTION

Among the objects of the present invention are to provide an improved single phase electric motor that does not use a discrete rotor position sensor; to provide an improved single phase motor using back EMF sensing to control commutation; to provide an single phase motor having a commutation circuit which is largely immune to noise; to provide an improved single phase electric motor having a commutation circuit compatible with slower electronic components; and to provide an improved single phase electric motor which is reliable, efficient and inexpensive to manufacture.

Generally, in one form, the invention comprises a motor including a stationary assembly and a rotatable assembly in magnetic coupling relation to the stationary assembly. The stationary assembly includes a winding, the rotation of the rotatable assembly inducing a back EMF in the winding. A power supply supplies a voltage across the winding to drive a current through the winding. A back EMF sensor connected to the winding generates a back EMF signal representative of the back EMF induced in the winding during periods of time when the voltage is being supplied across the winding. An inverter connected between the power supply and the winding commutates the winding as a function of the back EMF signal, whereby the rotatable assembly rotates.

The invention also comprises a method of operating a motor in combination with a power supply for supplying a voltage. The method comprises the steps of:

generating a back EMF signal representative of the sensed back EMF induced in a winding of the motor during periods of time when the voltage from the power source is being supplied across the winding; and commutating the winding as a function of the generated back EMF signal.

The invention also comprises a control circuit for a motor having a stationary assembly and a rotatable assembly in magnetic coupling relation to the stationary assembly. The stationary assembly includes a winding, the rotation of the rotatable assembly inducing a back EMF in the winding. The motor is for use in combination with a power supply for supplying a voltage across the winding to drive a current through the winding. A back EMF sensor connected to the winding generates a back EMF signal representative of the back EMF induced in the winding during periods of time when the voltage is being supplied across the winding. An inverter connected between the power supply and the winding commutates the winding as a function of the back EMF signal, whereby the rotatable assembly rotates.

Other objects and features will be in part apparent and in part pointed out hereinafter.

BRIEF DESCRIPTION OF THE DRAWINGS

FIG. 3 shows a block diagram of a single phase electric motor circuit which senses the back EMF to control commutation.

FIGS. 4–6 show a schematic diagram for implementing the circuit of FIG. 3.

Corresponding reference characters indicate corresponding parts throughout the drawings.

DETAILED DESCRIPTION OF PREFERRED EMBODIMENTS

The present invention covers circuits for sensing the back EMF or flux in a single phase electric motor during periods of time when current is flowing through the winding of the motor. The motor may be any electronically controllable motor typically powered by an electronic commutating circuit. Such motors include single and variable speed motors, selectable speed motors having a plurality of finite, discrete speeds and brushless dc motors, including electronically commutated motors and switched reluctance motors. In addition, the motors may have a single winding, a split phase winding or a multiphase winding. The motor may provide finite, discrete speeds selected by an electrical switch or the like.

Figure 1:
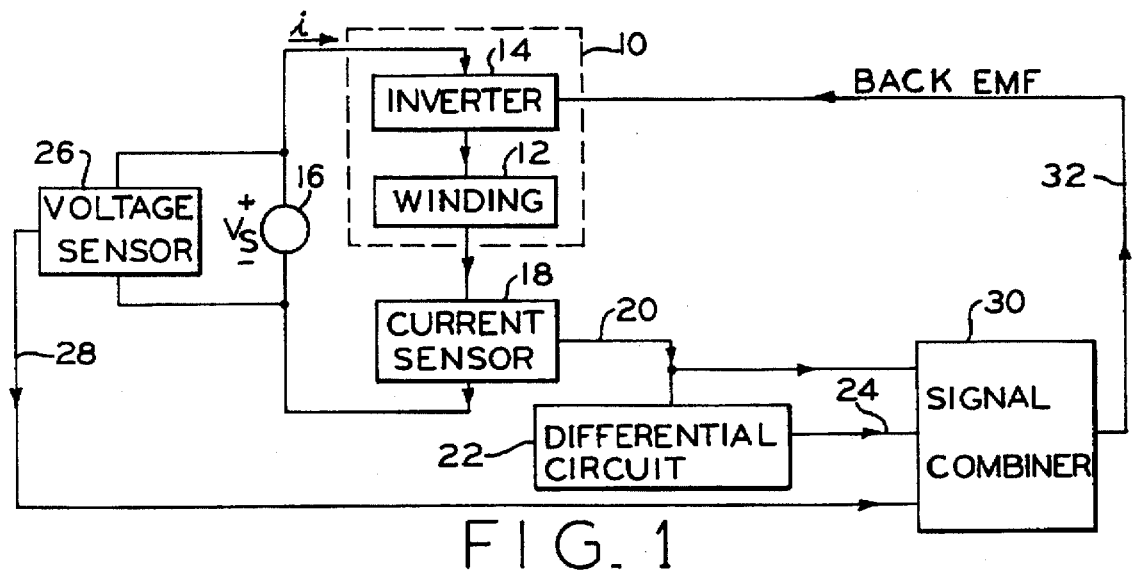
FIG. 1 shows a block diagram of a single phase electric motor circuit which senses the back EMF to control commutation.

FIG. 1 shows a block diagram of a circuit for sensing the back EMF voltage induced in a single phase motor during energization of the winding. This circuit is based on the following equation:

$$V_s = i \cdot r + L \cdot di/dt + V_{emf} \quad [1]$$

In equation 1, "$V_s$" represents the terminal voltage applied to the motor, "i" represents the current through the winding in the motor, "r" represents the equivalent resistance of the winding in the motor, "L" represents the inductance of the winding, "di/dt" represents the first derivative of the current through the winding, and "$V_{emf}$" represents the back EMF induced in the winding.

Solving for the back EMF in the winding, equation 1 becomes:

$$V_{emf} = V_s - i \cdot r - L \cdot di/dt \quad [2]$$

FIG. 1 includes a single phase motor shown within dashed line 10. Motor 10 has a single winding 12 and an inverter 14 for energizing winding 12. A voltage source 16 is connected across motor 10 for supplying power. A current sensor 18 is connected in series with motor 10 for sensing the current i flowing through winding 12. Current sensor 18 outputs a current signal via a line 20 which varies as a function of the current i flowing through winding 12. A differential circuit 22 receives the current signal from current sensor 18 and differentiates the signal to generate a differentiated current signal on a line 24.

A voltage sensor 26 is connected across voltage source 16 for sensing the voltage applied to motor 10. Voltage sensor 26 outputs a voltage signal on a line 28 which varies as a function of the voltage applied to motor 10. A signal combiner 30 receives the current signal from current sensor 18, the differentiated current signal from differential circuit 22, and the voltage signal from voltage sensor 26 and combines these signals to generate a back EMF signal which is output on a line 32. Signal combiner 30 preferably scales each of these three input signals relative to each other according to equation 2 so that the back EMF signal output on line 32 varies as a function of the back EMF voltage induced in winding 12 during rotation of the rotor.

Inverter 14 receives the back EMF signal from signal combiner 30. Inverter 14 includes circuitry for relating the back EMF signal to the position of the rotor in motor 10 to commutate or sequentially energize winding 12 to cause the rotor to rotate.

Figure 2:
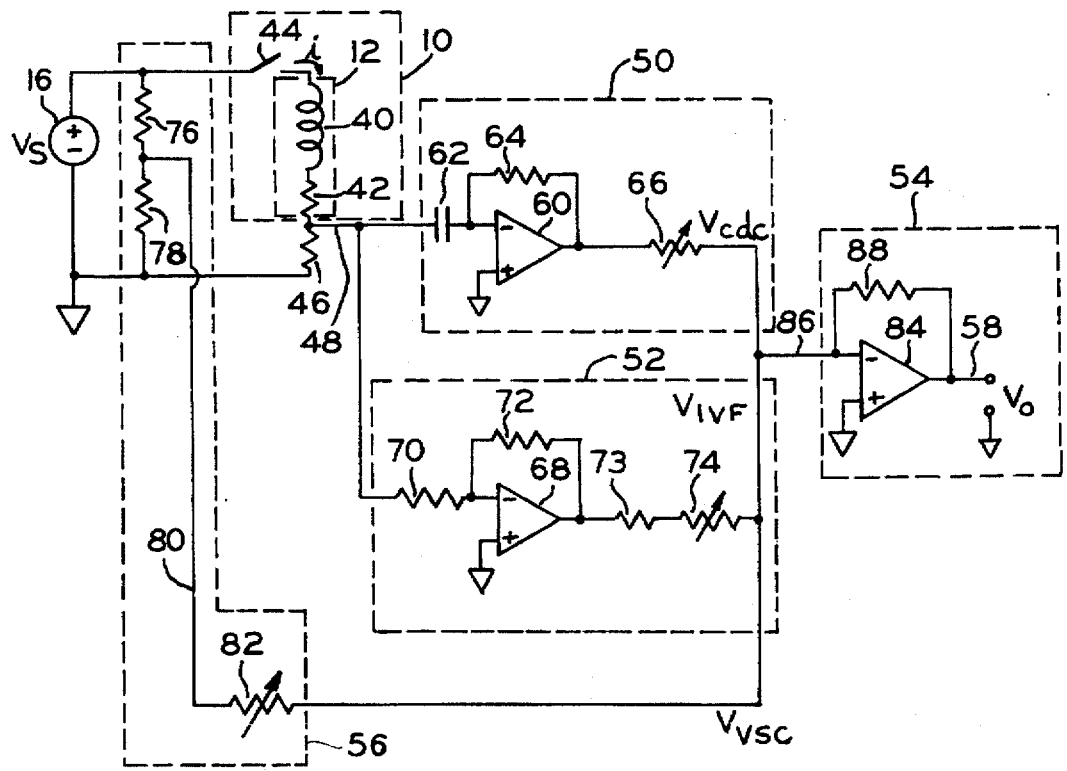
FIG. 2 shows a schematic diagram for implementing the circuit shown in FIG. 1.

FIG. 2 shows a schematic diagram for implementing the block diagram of FIG. 1. Single phase motor 10 includes a single winding 12 having an equivalent inductance represented by an inductor 40 and having an equivalent resistance represented by a resistor 42. Inverter 14 in motor 10 is symbolicly shown by a switch 44. Voltage source 16 is applied across motor 10 for supplying a single phase current through the winding 12 which has a single phase of operation. A small shunt resistor 46 is connected in series with motor 10 for sensing the current through motor 10. A line 48 is connected between motor 10 and resistor 46 for carrying the voltage appearing across resistor 46. This voltage varies as a function of the current through motor 10 in a known manner.

The other end of line 48 is connected to the input of a current differentiating circuit shown within a dashed line 50 and to the input of an inverse voltage follower circuit shown within a dashed line 52. The outputs of current differentiating circuit 50 and inverse voltage follower circuit 52 are connected to the input of an inverse voltage follower circuit 54. The output of a voltage sensing circuit 56 is also connected to the input of inverse voltage follower circuit 54.

The output voltage $V_{cdc}$ of current differentiating circuit 50 corresponds to the term "L·di/dt" in equation 2. The output voltage $V_{ivf}$ of inverse voltage follower circuit 52 corresponds to the term "i·r" in equation 2. The output voltage $V_{vsc}$ of voltage sensing circuit 56 corresponds to the term "$V_s$" in equation 2. Inverse voltage follower circuit 54 combines each of these three output voltage signals according to equation 2, i.e., the sum of $V_{cdc}+V_{ivf}+V_{vsc}$ is provided via line 86, to generate an output signal on a line 58 which corresponds to the back EMF signal induced in winding 12. This back EMF signal is used by circuitry (not shown) for controlling switch 44 to control commutation of winding 12 to cause the rotor to rotate.

In greater detail, current differentiating circuit 50 in FIG. 2 includes a operational amplifier 60 having its positive terminal grounded and its negative terminal connected via a capacitor 62 to line 48. A feedback resistor 64 is connected between the output of operational amplifier 60 and the negative terminal. The output of operational amplifier 60 is the derivative of the current signal supplied by line 48. A variable resistor 66 is used for scaling the magnitude of the differentiated current signal relative to the outputs of circuits 52 and 56 to provide output voltage $V_{cdc}=L \cdot di/dt$ according to equation 2.

Inverse voltage follower circuit 52 includes a operational amplifier 68 having its positive terminal grounded and its negative terminal connected via a resistor 70 to line 48. A feedback resistor 72 is connected between the output of operational amplifier 68 and the negative terminal. The output signal of operational amplifier 68 is the negative of the current signal supplied by line 48. A variable resistor 74 is connected for scaling the output of operational amplifier 68 relative to the output signals of circuits 50 and 56 to provide output voltage $V_{ivf}=i \cdot r$ according to equation 2.

Voltage sensing circuit 56 includes resistors 76 and 78 connected in series across voltage source 16. A line 80 is connected at one end between resistors 76 and 78 for carrying a voltage signal which varies as a function of the voltage applied to motor 10. Line 80 is connected at the other end to a variable resistor 82 for scaling the voltage signal relative to the output signals generated by circuits 50 and 52 to provide output voltage $V_{vsc}=V_s$ according to equation 2.

Negative voltage follower circuit 54 includes a operational amplifier 84. The positive terminal of operational amplifier 84 is grounded and the negative terminal is connected via a line 86 to receive the output signals generated by circuits 50, 52 and 56. A feedback resistor 88 is connected between the output of operational amplifier 84 and the negative terminal. The output voltage signal $V_o=V_{emf}$ of operational amplifier 84 on line 58 is a back EMF signal which varies as a function of the back EMF induced in winding 10.

The following table indicates component values which may be used in constructing the circuits shown in FIG. 2:

TABLE 1

| Circuit Component | Value |
| --- | --- |
| Resistor 46 | 1 ohm |
| Capacitor 62 | 1 microFarad |
| Resistor 64 | 21K |
| Variable Resistor 66 | up to 10K |
| Resistor 70 | up to 10K |
| Resistor 72 | 5.3K |
| Resistor 73 | 22K |
| Variable Resistor 74 | up to 10K |
| Resistor 76 | 90K |
| Resistor 78 | 2K |
| Variable Resistor 82 | up to 10K |
| Resistor 88 | 10K |

Each of operational amplifiers 60, 68 and 84 may be implemented with an operational amplifier such as Model No. LM356, connected across a ±15 volt DC power supply.

FIG. 3 shows a block diagram for sensing rotor position by sensing the flux in the winding of a motor. It has been found that such flux sensing circuitry may be more immune to noise than the circuitry shown in FIG. 2 in certain environments and can be implemented with slower electronic components.

The theory of the flux sensing circuit of FIG. 3 is derived from the following two equations:

$$V_{emf}=V_s-i \cdot r-L \cdot di/dt \qquad [3]$$

$$\text{Flux} = \int V_{cmf} dt \quad [4]$$

Accordingly:

$$\text{Flux} = \int (V_s - i \cdot r - L \cdot di/dt) \, dt \quad [5]$$

Equation 5 reduces to the following:

$$\text{Flux} = \int (V_s - i \cdot r) \, dt - L \cdot i \quad [6]$$

In equations 3 through 6, "$V_{cmf}$" represents the back EMF induced in the winding, "Flux" represents the flux of the motor while it is operating, "$V_s$" represents the terminal voltage applied to the motor, "i" represents the current through the winding in the motor, "r" represents the equivalent resistance of the winding in the motor, "L" represents the inductance of the winding, and "di/dt" represents the first derivative of the current through the winding.

FIG. 3 shows a block diagram for constructing a circuit according to equation 6 for sensing the flux in motor 10 to determine the position of the rotor. FIG. 3 includes voltage source 16 for applying power to motor 10 and current sensor 18 for sensing the current through motor 10. Current sensor 18 generates a current signal on line 20. The current signal output by current sensor 18 varies as a function of the changes in the current through motor 10. Voltage sensor 26 is connected across voltage source 16 for generating a voltage signal on line 28 which varies as a function of the voltage applied across motor 10.

A signal combiner 100 combines the current signal output by current sensor 18 and the voltage signal output by voltage sensor 26 to generate a combined signal on a line 102. Signal combiner 100 preferably scales the magnitudes of said current and voltage signals prior to combining them according to equation 6. An integrator 104 receives the combined signal from signal combiner 100 via line 102 and generates an integrated signal output on a line 106. A signal combiner 108 combines the current signal output by current sensor 18 with the integrated signal output by integrator 104 to generate a flux signal on a line 110. This flux signal corresponds directly to the back EMF signal induced in the winding of motor 10. Signal combiner 108 preferably scales the current and integrated signals according to equation 6 prior to combining them.

Inverter 14 receives the flux signal output by signal combiner 108 and uses it to control the commutation of winding 12 to cause the rotor of motor 10 to rotate. Inverter 14 preferably includes circuitry (not shown) for relating the flux signal output by signal combiner 108 to the position of the rotor and, therefore, to the periods of time when commutation of winding 12 is desired.

FIG. 4 shows a schematic diagram for implementing the flux sensing circuit of FIG. 3. FIG. 4 includes motor 10 having winding 12 represented by equivalent inductance 40 and equivalent resistance 42. Motor 10 also includes an inverter shown symbolically by switch 44. Motor 10 is powered by voltage source 16. Current sensing resistor 46 senses the current flowing through winding 12. Line 120 carries the voltage appearing across resistor 46. This voltage varies as a function of changes in the current though winding 12.

An inverse voltage follower circuit 122 is connected to line 120 for generating a current signal at its output on a line 124 which current signal corresponds to the current flowing through winding 12. Inverse voltage follower circuit 122 includes a operational amplifier 126 having its positive terminal grounded and having its negative terminal connected to line 120 via a resistor 128. A feedback resistor 130 is connected between the output of operational amplifier 126 and the negative terminal. The current signal on line 124 is connected to a variable scaling resistor 132. Variable scaling resistor 132 is connected at the other end to an input of an inverse voltage follower circuit 134.

A voltage sensing circuit 136 is also connected to the input of inverse voltage follower circuit 134. Voltage sensing circuit 136 includes a resistor 138 connected in series with a variable resistor 140 across voltage source 16. Resistors 138 and 140 thereby provide a voltage dividing network which generates an output voltage signal on a line 142 which varies as a function of the voltage applied across motor 10. Line 142 is connected at the other end to a variable scaling resistor 144. A line 146 is connected between variable resistor 144 and the input of inverse voltage follower circuit 134 for providing the voltage signal output by resistors 138 and 140. Variable resistor 144 allows the voltage signal to be scaled relative to the current signal output via resistor 132 according to equation 6.

Inverse voltage follower circuit 134 includes a operational amplifier 148 having its positive terminal grounded and its negative terminal connected to variable scaling resistors 132 and 144. A resistor 150 is connected between the output of operational amplifier 148 and the negative terminal. The output signal generated by operational amplifier 148 on a line 152 corresponds to the negative of the term "$V_s - i \cdot r$" in equation 6.

Line 152 is connected to an input of an integrating circuit 154. Integrating circuit 154 includes a operational amplifier 156 having its positive terminal grounded and having its negative terminal connected to line 152 via a resistor 158. Integrating circuit 154 also includes a variable resistor 160 connected at one end to the positive tap of the dc power supply and connected at the other end to the negative tap. The positive tap is preferably energized at 15 volts dc and the negative tap is preferably energized at negative 15 volts dc. Variable resistor 160 includes a movable arm 162 for varying the resistance seen by arm 162. Arm 162 is connected to the negative terminal of operational amplifier 156 via a resistor 164. A resistor 166 is connected in parallel with a capacitor 168. These parallel elements are connected at one end to the output of operational amplifier 156 via a line 170 and are connected at the other end to the negative terminal of operational amplifier 156. The output signal generated by operational amplifier 156 on line 170 corresponds to the term "$\int (V - i \cdot r) \, dt$" in equation 6.

A variable scaling resistor 172 is connected to line 170 for scaling the output of operational amplifier 156. A variable scaling resistor 174 is connected to line 124 for scaling the output of operational amplifier 126 relative to the output of operational amplifier 156 according to equation 6.

The other ends of variable scaling resistors 172 and 174 are connected together at the input of an inverse voltage follower circuit 176. Inverse voltage follower circuit 176 includes a operational amplifier 178 having its positive terminal grounded and its negative terminal connected to variable scaling resistors 172 and 174. A resistor 180 is connected in parallel with a capacitor 182. These parallel components are connected at one end to the output of operational amplifier 178 and are connected at the other end to the negative terminal. The output signal generated by operational amplifier 178 on a line 184 corresponds to the negative of the flux variable in equation 6. This output signal varies as a function of the back EMF signal induced in the winding of motor 10.

FIG. 5 shows a schematic circuit diagram for connection to the circuit of FIG. 4 for generating an output signal on a line 186 which corresponds directly to the back EMF generated by winding 12. The circuit of FIG. 5 includes a operational amplifier 188 having its positive terminal grounded and its negative terminal connected to line 184 via a capacitor 190. A capacitor 192 is connected in parallel with a resistor 194. These parallel components are connected at one end to the output of operational amplifier 188 and are connected at the other end to the negative terminal.

The circuit shown in FIG. 6 is designed for connection to the circuit shown in FIG. 4. The circuit shown in FIG. 6 is used for controlling the commutation of winding 12 in FIG. 4 to cause the rotor of motor 10 to rotate. FIG. 6 includes a comparator 200 connected in a voltage follower configuration. The positive terminal of comparator 200 is connected to line 184 via a resistor 202 and a capacitor 204. A resistor 203 is connected between resistor 202 and an optional capacitor 204 at one end and is connected to ground at the other end. The negative terminal of comparator 200 is connected to a moving arm 206 of a variable resistor 208. Variable resistor 208 is connected between the positive and negative taps of the dc power supply. A capacitor 210 is connected between the negative terminal of comparator 200 and ground. A feedback resistor 212 is connected between the output of comparator 200 and the positive terminal. Comparator 200 generates an output signal on a line 214.

Line 214 is connected to series resistors 216 and 218. The other end of resistor 218 is connected to the positive tap of the dc power supply. A line 220 is connected between resistors 216 and 218. The other end of line 220 is connected to the base terminal of a transistor 222. The emitter of transistor 222 is connected to the positive tap of the dc power supply. The collector of transistor 222 is connected to a light emitting diode 224. The other end of light emitting diode 224 is connected to the negative tap of the dc power supply via a resistor 226.

Light emitting diode 224 is a component of an optical coupler 228. Optical coupler 228 includes a photo-sensitive transistor 230. A resistor 232 is connected between the base and emitter terminals of photo-sensitive transistor 230. The emitter of photo-sensitive transistor 230 is also connected to ground via a line 234. The collector of photo-sensitive transistor 230 is connected to a line 236 and, via a resistor 238, to a line 240. Line 240 is connected to a positive tap on the dc power supply, preferably to a positive voltage which is less than the maximum dc voltage applied to other points in the circuit.

Lines 234, 236 and 240 are standard control lines understood by those skilled in the art. These lines are connected to a commonly-found inverter for controlling the commutation of winding 12. During periods of time when the flux signal generated by operational amplifier 178 in FIG. 4 is sufficient to indicate that commutation should occur, light emitting diode 224 emits light which renders photo-sensitive transistor 230 conductive. This effectively grounds line 236 to line 234. During periods of time when commutation should not occur, light emitting diode 224 generates insufficient light to render photo-sensitive transistor 230 conductive. In this second state, the voltage applied to line 240 is output, at least in part, over line 236. The inverter circuit which is connected to line 236, and preferably to lines 234 and 240 as well, monitors a change in voltage appearing on line 236 to control commutation of winding 12.

The following table indicates component values which may be used in constructing the circuits shown in FIGS. 4–6:

TABLE 2

| Circuit Component | Value |
| --- | --- |
| Resistor 46 | 1 ohm |
| Resistor 128 | 10K |
| Resistor 130 | 10K |
| Variable Resistor 132 | up to 20K |
| Resistor 138 | 100K |
| Variable Resistor 140 | up to 30K |
| Variable Resistor 144 | up to 10K |
| Resistor 150 | 10K |
| Resistor 158 | 10K |
| Variable Resistor 160 | up to 10K |
| Resistor 164 | 100K |
| Resistor 166 | 1M |
| Capacitor 168 | 1 microFarad |
| Variable Resistor 172 | up to 20K |
| Variable Resistor 174 | up to 20K |
| Resistor 180 | 10K |
| Capacitor 182 | .1 microFarad |
| Capacitor 190 | 1 microFarad |
| Capacitor 192 | .0033 microFarad |
| Resistor 194 | 10K |
| Resistor 202 | 10K |
| Resistor 203 | 10K |
| Capacitor 204 | 220 microFarad |
| Variable Resistor 208 | up to 100K |
| Capacitor 210 | .47 microFarad |
| Resistor 212 | 270K |
| Resistor 216 | 5.6K |
| Resistor 218 | 220 ohms |
| Resistor 226 | 1.5K |
| Resistor 232 | 150K |
| Resistor 238 | 8.2K |

Each of operational amplifiers 126, 148, 156, 178 and 188 may be implemented with an operational amplifier such as Model No. LF356, connected across a ±15 volt DC power supply. Comparator 200 may be implemented with an operational amplifier, Model No. LM339, connected across a ±15 volt DC power supply.

As seen above, the circuits shown in FIGS. 2 and 4–6 provide an instantaneous output of the back EMF with no memory of past events.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motor comprising:

a stationary assembly and a rotatable assembly in magnetic coupling relation thereto, said stationary assembly including a winding, the rotation of said rotatable assembly inducing a back EMF in said winding;

a power supply circuit for supplying a voltage across the winding to drive a current through the winding;

a back EMF circuit sensing a magnitude of a voltage applied to the winding by the power supply circuit and sensing a magnitude of the current in the winding due to the applied voltage, said circuit connected to the winding and generating a back EMF signal which is a function of the sensed magnitude of the voltage and the sensed magnitude of the current, said back emf signal representative of the back EMF induced in the winding during periods of time when the voltage is being applied to the winding by the power supply circuit; and an inverter connected between the power supply circuit and the winding for commutating the winding as a function of the back EMF signal, whereby the rotatable assembly rotates.

2. The motor of claim 1 wherein the back EMF sensor comprises:

a voltage circuit connected to the winding and generating a voltage signal which varies as a function of the magnitude of the voltage applied across the winding;

a current circuit connected to the winding and generating a current signal which varies as a function of the magnitude of the current in the winding;

a differential circuit connected to the current circuit and generating a differentiated current signal which varies as a function of a derivative of the current in the winding; and a signal combiner connected to the voltage circuit, the current circuit and the differential circuit, and generating the back EMF signal as a function of the voltage signal, the current signal and the differentiated current signal.

3. The motor of claim 2 wherein the differential circuit generates the differentiated current signal as a function of the first derivative of the current in the winding.

4. The motor of claim 2 wherein the voltage circuit comprises a voltage dividing network.

5. The motor of claim 2 wherein the current circuit comprises an inverse voltage follower circuit connected to the winding for generating the current signal.

6. The motor of claim 2 wherein the current circuit comprises a resistor connected between the power supply circuit and the winding.

7. The motor of claim 2 further comprising a scaling resistor for scaling the voltage signal, the current signal and the differentiated current signal according to the following equation:

$$V_{emf} = V_s - i \cdot r - L \cdot di/dt$$

wherein "$V_{emf}$" corresponds to the back EMF signal;

wherein "$V_s$" corresponds to a scaled voltage signal, a magnitude of the scaled voltage signal being representative of the voltage applied across the winding;

wherein "$i \cdot r$" corresponds to a scaled current signal, a magnitude of the scaled current signal being representative of a magnitude of the current in the winding multiplied by an internal resistance of the winding; and wherein "$L \cdot di/dt$" corresponds to a scaled differentiated current signal, a magnitude of the scaled differentiated current signal being representative of a magnitude of a first derivative of the current in the winding multiplied by an internal inductance of the winding.

8. The motor of claim 2 wherein the winding comprises a single winding having a single phase of operation and wherein the power supply circuit supplies a single phase current through the winding.

9. The motor of claim 2 wherein the signal combiner sums the voltage signal, the current signal and the differentiated current signal to generate the back EMF signal.

10. A motor comprising:

a stationary assembly and a rotatable assembly in magnetic coupling relation thereto, said stationary assembly including a winding, the rotation of said rotatable assembly inducing a back EMF in said winding;

a power supply circuit for supplying a voltage across the winding to drive a current through the winding;

a back EMF sensor connected to the winding and generating a back EMF signal representative of the back EMF induced in the winding during periods of time when the voltage is being supplied across the winding, wherein the back EMF sensor comprises:

a voltage circuit connected to the winding and generating a voltage signal which varies as a function of the voltage applied across the winding;

a current circuit connected to the winding and generating a current signal which varies as a function of the current in the winding;

an integrator connected to the voltage circuit and the current circuit, and generating an integrated signal which varies as a function of the voltage signal and the current signal; and a signal combiner connected to the integrator and the current circuit, and generating the back EMF signal as a function of the integrated signal and the current signal; and an inverter connected between the power supply circuit and the winding for commutating the winding as a function of the back EMF Signal, whereby the rotatable assembly rotates.

11. The motor of claim 10 wherein the voltage circuit comprises a voltage dividing network.

12. The motor of claim 10 wherein the current circuit further comprises an inverse voltage follower circuit connected to the winding for generating the current signal.

13. The motor of claim 10 wherein the integrator integrates a difference between the voltage signal and the current signal to generate the integrated signal.

14. The motor of claim 10 further comprising a scaling resistor for scaling the voltage signal, the current signal and the integrated signal according to the following equation:

$$\text{Flux} = \int (V_s - i \cdot r) \, dt - L \cdot i$$

wherein "Flux" corresponds to the back EMF induced in the winding;

wherein "$V_s$" corresponds to a scaled voltage signal, a magnitude of the scaled voltage signal being representative of the voltage applied across the winding;

wherein "$i \cdot r$" corresponds to a first scaled current signal, a magnitude of the first scaled current signal being representative of a magnitude of the current in the winding multiplied by an internal resistance of the winding; and wherein "$L \cdot i$" corresponds to a second scaled current signal, a magnitude of the second scaled current signal being representative of the magnitude of the current in the winding multiplied by an internal inductance of the winding.

15. The motor of claim 10 wherein the winding comprises a single winding having a single phase of operation and wherein the power supply circuit supplies a single phase current through the winding.

16. The motor of claim 10 wherein the current circuit comprises a resistor connected between the power supply circuit and the winding.

17. The motor of claim 1 wherein the winding comprises a single winding having a single phase of operation and wherein the power supply circuit supplies a single phase current through the winding.

18. A method of operating a motor in combination with a power supply for supplying a voltage, said method comprising the steps of:

sensing a magnitude of a voltage applied to the winding by the power supply and sensing a magnitude of the current in the winding due to the applied voltage, generating a back EMF signal which is a function of the sensed magnitude of the voltage and the sensed magnitude of the current, said back emf signal representative of a back EMF induced in a winding of the motor during periods of time when the voltage from the power source is being applied to the winding by the power supply; and commutating the winding as a function of the generated back EMF signal.

19. The method of claim 18 wherein the back EMF signal generating step comprises the steps of:

generating a voltage signal which varies as a function of the voltage applied across the winding; generating a current signal which varies as a function of the current in the winding;

generating a differentiated current signal which varies as a function of a derivative of the current in the winding; and generating the back EMF signal as a function of the voltage signal, the current signal and the differentiated current signal.

20. A method of operating a motor in combination with a power supply for supplying a voltage, said method comprising the steps of:

generating a back EMF signal representative of a sensed back EMF induced in a winding of the motor during periods of time when the voltage from the power source is being supplied across the winding, wherein the back EMF signal generating step comprises the steps of:

generating a voltage signal which varies as a function of the voltage applied across the winding;

generating a current signal which varies as a function of the current in the winding;

generating an integrated signal which varies as a function of the voltage signal and the current signal; and generating the back EMF signal as a function of the integrated signal and the current signal; and commutating the winding as a function of the generated back EMF signal.

21. A control circuit for a motor having a stationary assembly and a rotatable assembly in magnetic coupling relation thereto, the stationary assembly including a winding, the rotation of the rotatable assembly inducing a back EMF in the winding; said motor for use in combination with a power supply for supplying a voltage across the winding to drive a current through the winding; said control circuit comprising:

a back EMF circuit sensing a magnitude of a voltage applied to the winding by the power supply and sensing a magnitude of the current in the winding due to the applied voltage, said circuit connected to the winding and generating a back EMF signal which is a function of the sensed magnitude of the voltage and the sensed magnitude of the current, said back emf signal representative of the back EMF induced in the winding during periods of time when the voltage is being applied to the winding by the power supply; and an inverter connected between the power supply and the winding for commutating the winding as a function of the back EMF signal, whereby the rotatable assembly rotates.

22. The control circuit of claim 21 wherein the back EMF sensor comprises:

a voltage circuit connected to the winding and generating a voltage signal which varies as a function of the voltage applied across the winding;

a current circuit connected to the winding and generating a current signal which varies as a function of the current in the winding;

a differential circuit connected to the current circuit and generating a differentiated current signal which varies as a function of a derivative of the current in the winding; and a signal combiner connected to the voltage circuit, the current circuit and the differential circuit, and generating the back EMF signal as a function of the voltage signal, the current signal and the differentiated current signal.

23. A control circuit for a motor having a stationary assembly and a rotatable assembly in magnetic coupling relation thereto, the stationary assembly including a winding, the rotation of the rotatable assembly inducing a back EMF in the winding; said motor for use in combination with a power supply for supplying a voltage across the winding to drive a current through the winding; said control circuit comprising:

a back EMF sensor connected to the winding and generating a back EMF signal representative of the back EMF induced in the winding during periods of time when the voltage is being supplied across the winding, wherein the back EMF sensor comprises:

a voltage circuit connected to the winding and generating a voltage signal which varies as a function of the voltage applied across the winding;

a current circuit connected to the winding and generating a current signal which varies as a function of the current in the winding;

an integrator connected to the voltage circuit and the current circuit, and generating an integrated signal which varies as a function of the voltage signal and the current signal; and a signal combiner connected to the integrator and the current circuit, and generating the back EMF signal as a function of the integrated signal and the current signal; and an inverter connected between the power supply and the winding for commutating the winding as a function of the back EMF signal, whereby the rotatable assembly rotates.

* * * * *